U nited States Patent Office 2,710,283
Patented June 7, 1955

2,710,283

OIL COMPOSITIONS

Jack Linsk, Hammond, Ind., assignor to Standard Oil Company, Chicago, Ill., a corporation of Indiana No Drawing. Application September 26, 1951, Serial No. 248,451

15 Claims. (Cl. 252—57)

This invention relates to improvements in lubricant compositions, and more particularly is directed to hydrocarbon oil lubricant compositions having improved viscosity-temperature characteristics.

It is known that the viscosity of certain types of hydrocarbon oils and other oils is greatly affected by changes in temperature. For example, it is known that the viscosity of highly paraffinic oils does not change as greatly and as rapidly with changes in temperature as does the viscosity of naphthenic oils; this viscosity-temperature relationship is known in the art as the viscosity index, or V. I. Oils which change little in viscosity with changes in temperature are referred to as high V. I. oils, while those whose viscosity is materially affected by temperature changes are known as low V. I. oils. Where wide variations in operating conditions are encountered, for example, in the lubrication of internal combustion engines, the V. I. characteristics of the lubricant are of great importance, and accordingly, hydrocarbon oil compositions which exhibit a minimum change in viscosity under such conditions are highly desired.

The viscosity-temperature characteristics of an oil can be modified by incorporating in the oil small amounts of one or more of a wide variety of organic substances known in the art as V. I. improvers or V. I. addition agents. These are generally polymeric materials of moderate to high molecular weight. For example, alkyl polystyrenes have been used in lubricating oils as V. I. improvers but the shear stability of these products is poor, and the additive breaks down under high shearing conditions. Esterified copolymers of styrene and maleic anhydride have been used as V. I. improvers, but these products have a rubber-like consistency and are difficult to handle when not in solution; furthermore, they cause a relatively high percentage-wise increase in the viscosity of the blended lubricant composition. Other products which have V. I. improving properties cause an increase in the pourpoint of the lubricant, and for this reason are not extensively used.

It is an object of the present invention to provide an oil composition having improved viscosity-temperature relationship characteristics. Another object of the invention is to provide a hydrocarbon oil composition whose viscosity changes little with increase in temperature and which possesses good shear stability. Still another object of the invention is to provide a V. I. improver which produces a relatively small viscosity increase, percentage-wise, with respect to the oil in which it is incorporated. A further object of the invention is to provide a hydrocarbon oil composition having improved V. I. characteristics and improved pourpoint properties. Other objects and advantages of the invention will become apparent from the following description.

In accordance with the present invention the foregoing objects, among others, can be attained by incorporating in an oil an esterfied tripolymer, hereinafter described, in small but sufficient quantities to impart improved V. I. characteristics and improved pourpoint properties to the hydrocarbon oil. The substance employed in the present invention is an ester of a tripolymer of styrene, an unsaturated polycarboxylic acid or anhydride and an alkyl vinyl ether of the type $CH_2=CH-O-R$, in which R is an alkyl group of 2 to about 18 carbon atoms, and preferably from about 4 to about 10 carbon atoms. Examples of suitable unsaturated polycarboxylic acids and anhydrides are maleic acid, fumaric acid, aconitic acid, itaconic acid, citraconic acid, maleic anhydride, itaconic anhydride and citraconic anhydride, although maleic anhydride is preferred. Examples of suitable vinyl ethers are ethyl vinyl ether, n-butyl vinyl ether, isobutyl vinyl ether, 2-ethyl hexyl vinyl ether, octyl vinyl ether, dodecyl vinyl ether and octadecyl vinyl ether.

The tripolymer can be prepared by polymerizing a mixture of styrene, an unsaturated carboxylic acid or anhydride and an alkyl vinyl ether in a solution in a suitable solvent, such as toluene, benzene or acetone at a temperature from about room temperature to the boiling point of the solvent. The reaction is initiated by a suitable catalyst such as an organic peroxide, for example, benzoyl peroxide, acetyl peroxide, stearyl peroxide, chlorbenzoyl peroxide, dimethyl peroxide, etc., or an inorganic catalyst, such as for example, an alkali metal persulfate or hydrogen peroxide. In the preparation of the tripolymer, styrene, the unsaturated carboxylic acid or anhydride, and the alkyl vinyl ether can be used in the molar ratio of about 1:10:9 to about 9:10:1, but preferably about 1:2:1. The tripolymer precipitates from the reaction mixture and is then esterified by boiling with an excess of the selected alcohol in benzene or toluene solution, in the presence of a suitable catalyst, such as sulfuric acid or toluene sulfonic acid. Any suitable aliphatic alcohol can be used in the esterification reaction although alphatic alcohols of at least about 6 carbon atoms, and preferably 8 to 20 carbon atoms, are preferred. When vinyl ethers containing particularly long alkyl groups such as octadecyl vinyl ether are used, alcohols having as low as four or even two carbon atoms per molecule may be used to obtain hydrocarbon-soluble polymers. Examples of suitable aliphatic alcohols are hexyl alcohol, octyl alcohol, nonyl alcohol, oxo-nonyl alcohol, n-dodecyl alcohol, n-tetradecyl alcohol, n-hexadecyl alcohol and n-tridecyl alcohol. When the esterification is judged complete the acid is removed by water washing and the solution is dried, for example with anhydrous sodium sulfate, or by distilling the water with a minor amount of solvent. Excess alcohol and solvent may then be removed and recovered by suitable means, preferably by vacuum distillation. An alternative procedure involves recovery of alcohol and solvent by steam distillation. In the latter case the polymer may be dissolved in naphtha and the residual moisture removed by drying in the usual way.

The tripolymers of this invention are moderately tacky and have softening points slightly above room temperature. They are easily handled and dissolve readily in hydrocarbon oils. It will be apparent to those skilled in the art that a wide variety of compositions is possible. Thus, if it is desired to use a short chain alcohol to esterify the tripolymers of this invention, it will be desirable to use a vinyl ether having a longer alkyl group in the original tripolymer, although a vinyl ether having a short alkyl group will also be satisfactory. Tripolymers in the molecular weight range of 5000 to about 200,000, and preferably 10,000 to about 50,000 can be employed in the present invention.

The esterified tripolymer is suitably employed in hydrocarbon oils in amounts of from about 0.05% to about 15%, by weight, and preferably from about 0.1% to about 5%, by weight. The oil can be any oil suitable for the desired use such as a natural or synthetic hydrocarbon oil, a vegetable oil, an animal oil, a marine oil or a synthetic lubricating oil, such as the "Ucon" oils which are diester oil-like products obtained by the polymerization of alkylene oxides.

The hydrocarbon oil can be any hydrocarbon oil having a Saybolt Universal viscosity above about 60 seconds at 100° F., for example about 80 seconds at 100° F. to about 500 seconds at 210° F., although oils of lower and higher viscosities can be employed. The oil can be a petroleum distillate or residuum or a synthetic hydrocarbon oil or mixtures of such oils.

The following example is given to illustrate one method of preparing the ester polymers of my invention and is not intended to limit the scope thereof.

EXAMPLE I

A benzene solution of styrene, maleic anhydride and 2-ethylhexyl vinyl ether in the molar ratio of 1:2:1, was refluxed in the presence of 0.5% benzoyl peroxide based on the total monomer weight. The solid tripolymer which precipitated from the boiling solution was separated and esterified by boiling with an excess of n-octyl alcohol in toluene solution, using a little sulfuric acid as the catalyst. When the esterification was complete the reaction mixture was water-washed to remove the acid, and the excess alcohol and solvent were removed by steam distillation. The product was dissolved in naphtha and the solution was dried with anhydrous calcium sulfate. The polymer was obtained as a soft solid, light brown in color, by removing solvent in vacuum.

The n-hexyl, n-dodecyl, n-tetradecyl, n-nonyl, 2-ethyl hexyl esters, and the n-octyl ester were similarly prepared.

The effectiveness of the herein-described tripolymer esters in improving the V. I. of hydrocarbon oils is demonstrated by the data in Table I.

*Table I*

| Tripolymer [1] Ester | Percent Polymer Ester in Oil | Viscosity, S. S. U. 100° F. | Viscosity, S. S. U. 210° F. | V. I. |
|---|---|---|---|---|
| | 0 | 94.6 | 39.0 | 103 |
| n-Octyl Ester | 0.53 | 100.4 | 39.9 | 120 |
| | 1.0 | 105.4 | 40.8 | 130 |
| | 1.56 | 111.8 | 41.8 | 139 |
| | 2.04 | 118.2 | 43.0 | 146 |
| | 3.03 | 132.1 | 45.3 | 152 |
| n-Hexyl Ester | 0.49 | 97.0 | 39.3 | 108 |
| | 1.05 | 99.3 | 39.9 | 124 |
| | 2.00 | 102.9 | 40.9 | 140 |
| | 3.03 | 105.5 | 41.5 | 147 |
| | 4.00 | 110.6 | 42.6 | 154 |
| n-Dodecyl Ester | 0.53 | 99.6 | 39.7 | 112 |
| | 1.01 | 104.4 | 40.5 | 126 |
| | 1.97 | 114.6 | 42.1 | 139 |
| | 3.17 | 126.7 | 44.1 | 148 |
| | 3.96 | 138.3 | 45.9 | 151 |
| n-Tetradecyl Ester | 0.50 | 98.8 | 39.6 | 115 |
| | 0.95 | 104.3 | 40.4 | 123 |
| | 1.97 | 114.2 | 42.0 | 138 |
| | 3.07 | 128.0 | 44.2 | 147 |
| | 4.04 | 141.6 | 46.0 | 149 |

[1] Styrene, maleic anhydride, 2-ethylhexyl vinyl ether tripolymer.

In addition to imparting V. I. improvement properties to hydrocarbon oils, the esterified tripolymers are also effective pourpoint depressors. Thus, the n-tetradecyl ester of the tripolymer of styrene, maleic anhydride, and 2-ethyl hexyl vinyl ether reduced the pourpoint of a −5° F. pour hydrocarbon oil to −20° F. in 0.05% concentration, and to −25° F. in 0.1% concentration. A 0.1% solution of the same ester tripolymer in a +5° F. pourpoint hydrocarbon oil reduced the pourpoint to −25° F.

The pourpoint depressing properties of the n-dodecyl and n-tetradecyl esters of the tripolymer of styrene, maleic anhydride and n-butyl vinyl ether are demonstrated by the data in Table II.

*Table II*

| Tripolymer Ester | Hydramatic Oil | SAE-10 Base Oil | SAE-20 Base Oil | Pourpoint, ° F. |
|---|---|---|---|---|
| n-Dodecyl | 0.0 | | | −5 |
| | 0.05 | | | −20 |
| | 0.10 | | | −25 |
| | | 0.0 | | +5 |
| | | 0.05 | | −15 |
| | | 0.10 | | −30 |
| n-Tetradecyl | 0.0 | | | −5 |
| | 0.05 | | | −20 |
| | 0.10 | | | −20 |
| | | 0.0 | | +5 |
| | | 0.05 | | −5 |
| | | 0.10 | | −20 |
| | | | 0.0 | 0 |
| | | | 0.05 | 0 |
| | | | 0.10 | −10 |

The esterified tripolymers of the present invention can be used alone in hydrocarbon oils, or if desired, can be employed in combination with other hydrocarbon additives, for example detergent-type additives, corrosion inhibitors, antioxidants, sludge inhibitors, metal deactivators, E. P. agents, etc.

While I have described my invention by reference to certain specific embodiments thereof, these have been given by way of illustration only and the invention should not be limited thereto, but includes within its scope such modifications and variations as come within the spirit of the appended claims.

I claim:

1. A composition comprising a major proportion of a hydrocarbon oil and a small proportion, sufficient to improve the Viscosity Index and pourpoint properties of said hydrocarbon oil, of an ester of an aliphatic monohydroxy alcohol having at least 2 carbon atoms with a tripolymer, having a molecular weight of from about 5000 to about 200,000, of styrene, an unsaturated polybasic compound selected from the group consisting of maleic acid, fumaric acid, aconitic acid, itaconic acid, citraconic acid and the anhydrides thereof, and an alkyl vinyl ether having from about 2 to about 18 carbon atoms in the alkyl group, said styrene, unsaturated polybasic compound, and alkyl vinyl ether being employed in the molar ratio of from about 1:10:9 to 9:10:1.

2. A composition as described in claim 1 in which the unsaturated polybasic compound is maleic acid.

3. A composition as described in claim 1 in which the unsaturated polybasic compound is maleic anhydride.

4. A composition as described in claim 1 in which the unsaturated polybasic compound is itaconic anhydride.

5. A lubricant composition comprising a major proportion of a hydrocarbon oil and from about 0.05% to about 15%, by weight, of a tripolymer of styrene, maleic anhydride and an alkyl vinyl ether of 2 to 18 carbon atoms in the alkyl group, which tripolymer has been esterified with a saturated aliphatic monohydroxy alcohol containing at least 6 carbon atoms in the alkyl group said styrene, maleic anhydride and alkyl vinyl ether being employed in the molar ratio of from 1:10:9 to 9:10:1.

6. A lubricant composition comprising a major proportion of a hydrocarbon oil and from about 0.05% to about 15% of an ester of an aliphatic monohydroxy alcohol containing 6 carbon atoms with a tripolymer of styrene, maleic anhydride and n-butyl vinyl ether said styrene, maleic anhydride, and n-butyl vinyl ether being employed in the molar ratio of from about 1:10:9 to 9:10:1.

7. A lubricant composition comprising a major proportion of a hydrocarbon oil and from about 0.05% to about 15% of an ester of an aliphatic monohydroxy alcohol containing at least 6 carbon atoms with a tripolymer of styrene, maleic anhydride and hexyl vinyl ether said styrene, maleic anhydride, and hexyl vinyl ether being employed in the molar ratio of from about 1:10:9 to 9:10:1.

8. A lubricant composition comprising a major proportion of a hydrocarbon oil and from about 0.05% to about 15% of an ester of an aliphatic monohydroxy alcohol containing at least 6 carbon atoms with a tripolymer of styrene, maleic anhydride and dodecyl vinyl ether said styrene, maleic anhydride, and dodecyl vinyl ether being employed in the molar ratio of from about 1:10:9 to 9:10:1.

9. A lubricant composition comprising a major proportion of a hydrocarbon oil and from about 0.05% to about 15% of an ester of an aliphatic monohydroxy alcohol containing at least 6 carbon atoms with a tripolymer of styrene, maleic anhydride and tetradecyl vinyl ether said styrene, maleic anhydride, and tetra decyl vinyl ether being employed in the molar ratio of from about 1:10:9 to 9:10:1.

10. A lubricant composition comprising a major proportion of a hydrocarbon oil and from about 0.05% to about 15%, by weight, of a tripolymer of styrene, maleic anhydride and 2-ethylhexyl vinyl ether, which tripolymer has been esterified with an aliphatic monohydroxy alcohol containing at least 6 carbon atoms said styrene, maleic anhydride, and 2-ethylhexyl vinyl ether being employed in the molar ratio of from 1:10:9 to 9:10:1.

11. A lubricant composition as described in claim 10 in which the aliphatic alcohol is hexyl alcohol.

12. A lubricant composition as described in claim 10 in which an aliphatic alcohol is octyl alcohol.

13. A lubricant composition as described in claim 10 in which the aliphatic alcohol is tetradecyl alcohol.

14. A lubricant composition comprising a major proportion of a hydrocarbon lubricating oil and from about 0.05% to about 15%, by weight, of a tripolymer of styrene, maleic anhydride and n-butyl vinyl ether which tripolymer has been esterified with an aliphatic monohydroxy alcohol containing 8 to 20 carbon atoms said styrene, maleic anhydride, and n-butyl vinyl ether being employed in the molar ratio of from 1:10:9 to 9:10:1.

15. A lubricant composition as described in claim 14 in which the tripolymer has a molecular weight of from about 5000 to about 200,000.

References Cited in the file of this patent

UNITED STATES PATENTS

| | | |
|---|---|---|
| 2,020,703 | Schumann et al. | Nov. 12, 1935 |
| 2,047,398 | Voss et al. | July 14, 1936 |
| 2,519,764 | Jacobson | Aug. 22, 1950 |
| 2,540,794 | Otto et al. | Feb. 6, 1951 |
| 2,542,542 | Lippencott et al. | Feb. 20, 1951 |
| 2,570,846 | Otto et al. | Oct. 9, 1951 |
| 2,615,844 | Giammaria | Oct. 28, 1952 |
| 2,615,845 | Lippincott et al. | Oct. 28, 1952 |